(12) United States Patent
Ooi et al.

(10) Patent No.: US 9,595,174 B2
(45) Date of Patent: Mar. 14, 2017

(54) POINT OF SALE TERMINAL HAVING ENHANCED SECURITY

(71) Applicant: VERIFONE INC., San Jose, CA (US)

(72) Inventors: Wai Loon Ooi, Singapore (SG); Tai Liang Ting, Singapore (SG); Derek Nang Hui Chan, Singapore (SG)

(73) Assignee: VERIFONE, INC., San Jose, CA (US)

( * ) Notice: Subject to any disclaimer, the term of this patent is extended or adjusted under 35 U.S.C. 154(b) by 0 days.

(21) Appl. No.: 14/692,219

(22) Filed: Apr. 21, 2015

(65) Prior Publication Data
US 2016/0314664 A1    Oct. 27, 2016

(51) Int. Cl.
G08B 13/14    (2006.01)
G08B 13/06    (2006.01)

(52) U.S. Cl.
CPC .................................. *G08B 13/06* (2013.01)

(58) Field of Classification Search
CPC ....................................................... G08B 13/06
USPC ....................................................... 340/568.1
See application file for complete search history.

(56) References Cited

U.S. PATENT DOCUMENTS

| | | |
|---|---|---|
| 3,466,643 A | 9/1969 | Moorefield |
| 3,735,353 A | 5/1973 | Donovan et al. |
| 3,818,330 A | 6/1974 | Hiroshima et al. |
| 3,941,964 A | 3/1976 | Yoder |
| 4,486,637 A | 12/1984 | Chu |
| 4,527,030 A | 7/1985 | Oelsch |
| 4,593,384 A | 6/1986 | Kleijne |
| 4,749,368 A | 6/1988 | Mouissie |
| 4,807,284 A | 2/1989 | Kleijne |
| 4,847,595 A | 7/1989 | Okamoto |
| 5,086,292 A | 2/1992 | Johnson et al. |
| 5,237,307 A | 8/1993 | Gritton |
| 5,239,664 A | 8/1993 | Verrier et al. |

(Continued)

FOREIGN PATENT DOCUMENTS

| | | |
|---|---|---|
| DE | 22 41 738 | 3/1973 |
| DE | 60 101 096 | 7/2004 |

(Continued)

OTHER PUBLICATIONS

A Notice of Allowance dated Oct. 26, 2004, which issued during the prosecution of Applicant's U.S. Appl. No. 10/326,726.

(Continued)

*Primary Examiner* — Tanmay Shah
(74) *Attorney, Agent, or Firm* — Hunton & Williams LLP

(57) ABSTRACT

A case-open switch assembly for a data entry device including a housing, the case-open switch assembly including at least one arrangement of electrical contacts arranged on a base surface, the at least one arrangement including a central contact and at least one contact spaced from and at least partially surrounding the central contact and at least one element, having a conductive contact surface including a central contact engagement portion and at least one contact engagement portion spaced from and at least partially surrounding the central contact engagement portion, which contacts the central contact and the at least one contact spaced from and at least partially surrounding the central contact and defines a short circuit between the central contact and at least one of the at least one contact when in a closed operative orientation.

20 Claims, 3 Drawing Sheets

(56) References Cited

U.S. PATENT DOCUMENTS

| | | |
|---|---|---|
| 5,353,350 A | 10/1994 | Unsworth et al. |
| 5,506,566 A | 4/1996 | Oldfield et al. |
| 5,559,311 A | 9/1996 | Gorbatoff |
| 5,586,042 A | 12/1996 | Pisau et al. |
| 5,627,520 A | 5/1997 | Grubbs et al. |
| 5,675,319 A | 10/1997 | Rivenberg et al. |
| 5,809,143 A | 9/1998 | Hughes |
| 5,861,662 A | 1/1999 | Candelore |
| 5,877,547 A | 3/1999 | Rhelimi |
| 5,998,858 A | 12/1999 | Little et al. |
| 6,288,640 B1 | 9/2001 | Gagnon |
| 6,359,338 B1 | 3/2002 | Takabayashi |
| 6,396,400 B1 | 5/2002 | Epstein, III et al. |
| 6,414,884 B1 | 7/2002 | DeFelice et al. |
| 6,438,825 B1 | 8/2002 | Kuhn |
| 6,463,263 B1 | 10/2002 | Feilner et al. |
| 6,466,118 B1 | 10/2002 | Van Zeeland et al. |
| 6,563,488 B1 | 5/2003 | Rogers et al. |
| 6,571,948 B2 | 6/2003 | Jones |
| 6,633,241 B2 | 10/2003 | Kaikuranta et al. |
| 6,646,565 B1 | 11/2003 | Fu et al. |
| 6,669,100 B1 | 12/2003 | Rogers et al. |
| 6,830,182 B2 | 12/2004 | Izuyama |
| 6,853,093 B2 | 2/2005 | Cohen et al. |
| 6,874,092 B1 | 3/2005 | Motoyama et al. |
| 6,912,280 B2 | 6/2005 | Henry |
| 6,917,299 B2 | 7/2005 | Fu et al. |
| 6,921,988 B2 | 7/2005 | Moree |
| 6,936,777 B1 | 8/2005 | Kawakubo |
| 7,170,409 B2 | 1/2007 | Ehrensvard et al. |
| 7,270,275 B1 | 9/2007 | Moreland et al. |
| 7,283,066 B2 | 10/2007 | Shipman |
| 7,497,378 B2 | 3/2009 | Aviv |
| 7,784,691 B2 | 8/2010 | Mirkazemi-Moud et al. |
| 7,835,521 B1 | 11/2010 | Pinheiro |
| 7,843,339 B2 | 11/2010 | Kirmayer |
| 7,898,413 B2 | 3/2011 | Hsu et al. |
| 8,325,067 B2 | 12/2012 | Moller et al. |
| 8,513,548 B2 | 8/2013 | Rollet et al. |
| 8,595,514 B2 | 11/2013 | Mirkazemi-Moud |
| 9,013,336 B2 | 4/2015 | Schulz et al. |
| 9,032,222 B2 | 5/2015 | Mirkazemi-Moud et al. |
| 2001/0032211 A1 | 10/2001 | Kuzumaki |
| 2002/0002683 A1 | 1/2002 | Benson et al. |
| 2003/0025617 A1 | 2/2003 | Kunigkeit et al. |
| 2004/0031673 A1* | 2/2004 | Levy .................. H01H 13/702 200/521 |
| 2004/0118670 A1 | 6/2004 | Park et al. |
| 2004/0120101 A1 | 6/2004 | Cohen et al. |
| 2005/0081049 A1 | 4/2005 | Nakayama et al. |
| 2005/0138433 A1 | 6/2005 | Linetsky |
| 2005/0184870 A1 | 8/2005 | Galperin et al. |
| 2006/0049255 A1 | 3/2006 | Mueller et al. |
| 2006/0049256 A1 | 3/2006 | Mueller et al. |
| 2006/0192653 A1 | 8/2006 | Atkinson et al. |
| 2006/0201701 A1 | 9/2006 | Coleman et al. |
| 2007/0016963 A1 | 1/2007 | Robinson |
| 2007/0040674 A1* | 2/2007 | Hsu ..................... G08B 29/046 340/539.31 |
| 2007/0102272 A1 | 5/2007 | Sano et al. |
| 2007/0152042 A1 | 7/2007 | Mittler |
| 2007/0196156 A1 | 8/2007 | Lewis |
| 2007/0204173 A1 | 8/2007 | Kuhn |
| 2008/0135617 A1 | 6/2008 | Aviv |
| 2008/0180245 A1 | 7/2008 | Hsu et al. |
| 2008/0278353 A1 | 11/2008 | Smith et al. |
| 2009/0058628 A1 | 3/2009 | Kirmayer |
| 2009/0184850 A1 | 7/2009 | Schulz et al. |
| 2011/0063109 A1 | 3/2011 | Ostermoller |
| 2011/0215938 A1 | 9/2011 | Neo et al. |
| 2011/0248860 A1 | 10/2011 | Avital et al. |
| 2011/0279279 A1 | 11/2011 | Mirkazemi-Moud et al. |
| 2012/0025983 A1 | 2/2012 | Ben-Zion et al. |
| 2012/0106113 A1 | 5/2012 | Kirmayer |
| 2012/0180140 A1 | 7/2012 | Barrowman et al. |
| 2013/0067534 A1 | 3/2013 | Soffer |
| 2014/0091930 A1 | 4/2014 | Mirkazemi-Moud |
| 2015/0128297 A1 | 5/2015 | Mirkazemi-Moud et al. |

FOREIGN PATENT DOCUMENTS

| | | |
|---|---|---|
| EP | 0375545 A1 | 6/1990 |
| EP | 0375545 B1 | 2/1995 |
| EP | 1421549 | 5/2004 |
| EP | 1432031 | 6/2004 |
| EP | 1676182 | 7/2006 |
| FR | 2 806 507 | 9/2001 |
| FR | 2 911 000 | 7/2008 |
| GB | 892198 | 3/1962 |
| GB | 1 369 739 | 10/1974 |
| GB | 2 178 235 | 2/1987 |
| GB | 2 353 401 | 2/2001 |
| GB | 2 372 363 | 8/2002 |
| GB | 2 411 756 | 9/2006 |
| JP | 2002-108711 | 4/2002 |
| JP | 2003-100169 | 4/2003 |
| WO | 01/63994 | 8/2001 |
| WO | 03/019467 | 3/2003 |
| WO | 2005/041002 | 5/2005 |
| WO | 2005/086546 | 9/2005 |
| WO | 2009/091394 | 7/2009 |
| WO | 2010/082190 | 7/2010 |

OTHER PUBLICATIONS

An International Preliminary Report on Patentability dated Jul. 19, 2011, which issued during the prosecution of Applicant's PCT/IL2009/000724.

An International Search Report on a Written Opinion both dated Nov. 10, 2009, which issued during the prosecution of Applicant's PCT/IL2009/000724.

A Notice of Allowance dated Dec. 19, 2014, which issued during the prosecution of Applicant's U.S. Appl. No. 12/355,857.

Supplementary European Search Report dated Oct. 31, 2013 which issued during the prosecution of Applicant's European App No. 07869932.

A Notice of Allowance dated Oct. 9, 2014, which issued during the prosecution of Applicant's U.S. Appl. No. 14/082,704.

An Office Action dated Aug. 17, 2015, which issued during the prosecution of U.S. Appl. No. 14/592,296.

An Office Action dated Oct. 16, 2012, which issued during the prosecution of U.S. Appl. No. 12/355,857.

An Office Action dated Jul. 2, 2014, which issued during the prosecution of U.S. Appl. No. 14/082,704.

An Office Action dated May 11, 2012, which issued during the prosecution of U.S. Appl. No. 12/355,857.

An Office Action dated Mar. 13, 2008 which issued during the prosecution of U.S. Appl. No. 11/636,369.

An Office Action dated Mar. 27, 2009 which issued during the prosecution of U.S. Appl. No. 11/585,673.

An Office Action dated Dec. 14, 2009 which issued during the prosecution of U.S. Appl. No. 11/585,673.

A Notice of Allowance dated Sep. 13, 2013, which issued during the prosecution of U.S. Appl. No. 12/666,054.

A Notice of Allowance dated Feb. 24, 2014, which issued during the prosecution of U.S. Appl. No. 13/717,957.

An Office Action dated Nov. 21, 2013, which issued during the prosecution of U.S. Appl. No. 13/717,957.

U.S. Appl. No. 61/011,993, filed Jan. 22, 2008.

Van Ess, Dave; "Capacitive touch switches for automotive applications", http://www.automotivedesignline.com/, Feb. 2006.

An Office Action dated Apr. 10, 2012, which issued during the prosecution of U.S. Appl. No. 12/758,150.

An Office Action dated May 13, 2010, which issued during the prosecution of Applicant's U.S. Appl. No. 11/845,435.

A Notice of Allowance dated Sep. 10, 2010, which issued during the prosecution of Applicant's U.S. Appl. No. 11/845,435.

An Office Action dated May 28, 2004, which issued during the prosecution of U.S. Appl. No. 10/326,726.

(56) References Cited

OTHER PUBLICATIONS

An International Search Report and a Written Opinion both dated Apr. 30, 2012, which issued during the prosecution of Applicant's PCT/US2012/020142.
Kremin, et al., "Capacitive sensing—waterproof capacitance sensing", Cypress Perform, Dec. 2006.
An Office Action dated Jul. 11, 2014, which issued during the prosecution of U.S. Appl. No. 12/355,857.

* cited by examiner

POINT OF SALE TERMINAL HAVING ENHANCED SECURITY

REFERENCE TO RELATED APPLICATIONS

Reference is made to the following U.S. patents, owned by assignee, the disclosures of which are hereby incorporated by reference, which are believed to relate to subject matter related to the subject matter of the present application:

U.S. Pat. Nos. 6,853,093; 8,325,067; 8,595,514; and 9,013,336.

FIELD OF THE INVENTION

The present invention relates generally to secure keypad devices and more particularly to data entry devices having anti-tamper functionality.

BACKGROUND OF THE INVENTION

Various types of secure keypad devices are known in the art.

SUMMARY OF THE INVENTION

The present invention seeks to provide improved secure keypad devices.

There is thus provided in accordance with a preferred embodiment of the present invention a data entry device including a housing formed of at least two housing portions, data entry circuitry located within the housing, at least one case-open switch assembly operative to sense when the housing is opened and tamper indication circuitry operative to receive an input from the at least one case-open switch assembly and to provide an output indication of possible tampering with the data entry circuitry located within the housing, the at least one case-open switch assembly including at least one arrangement of electrical contacts arranged on a base surface, the at least one arrangement including a central contact and at least one contact spaced from and at least partially surrounding the central contact and at least one element, having a conductive contact surface including a central contact engagement portion and at least one contact engagement portion spaced from and at least partially surrounding the central contact engagement portion, which contacts the central contact and the at least one contact spaced from and at least partially surrounding the central contact and defines a short circuit between the central contact and at least one of the at least one contact only when the housing is closed.

Preferably, the central contact engagement portion and the at least one contact engagement portion spaced from and at least partially surrounding the central contact engagement portion are electrically connected.

In accordance with a preferred embodiment of the present invention the conductive contact surface is defined by a conductive coating formed on the at least one element. Additionally, the conductive coating includes carbon.

Preferably, the at least one element includes silicone rubber.

In accordance with a preferred embodiment of the present invention the data entry device also includes a resilient key mat, which defines a plurality of depressible keys and the at least one element.

Preferably, at least one of the housing portions includes, on an underside surface thereof, at least one case open switch actuation protrusion, which engages the at least one element, whereby, only when the housing is closed, the at least one case open switch actuation protrusion engages the at least one element and causes the conductive contact surface to define the short circuit between the central contact and at least one of the at least one contact. Additionally, opening of the housing retracts the at least one case open switch actuation protrusion from the at least one element and enables displacement of the element out of short circuit defining contact with the central contact and at least one of the at least one contact.

In accordance with a preferred embodiment of the present invention the central contact engagement portion and the at least one contact engagement portion spaced from and at least partially surrounding the central contact engagement portion are mutually spaced by a recess. Additionally, the central contact engagement portion, the at least one contact engagement portion spaced from and at least partially surrounding the central contact engagement portion and the recess are mutually short circuited by a conductive coating formed thereon.

Preferably, the at least one arrangement of electrical contacts includes a central contact and at least two contacts spaced from and at least partially surrounding the central contact and the at least one element defines a short circuit between some, but not all, of the arrangement of electrical contacts when the housing is closed. Additionally, when the central contact engagement portion of the at least one element contacts the central contact, no part of the at least one element is in electrical contact with at least one of the at least two contacts.

In accordance with a preferred embodiment of the present invention the input to the tamper indication circuitry includes an indication of whether the at least one element is simultaneously in contact with both the central contact and one but not all of the at least two contacts. Additionally or alternatively, the input to the tamper indication circuitry includes an indication of whether all of the at least two contacts are short circuited with the central contact.

Preferably, the data entry device also includes at least one anti-tampering grid, formed of a multiplicity of interconnected anti-tampering electrical conductors, associated with the tamper indication circuitry.

This is also provided in accordance with another preferred embodiment of the present invention a case-open switch assembly for a data entry device including a housing, the case-open switch assembly including at least one arrangement of electrical contacts arranged on a base surface, the at least one arrangement including a central contact and at least one contact spaced from and at least partially surrounding the central contact, and at least one element, having a conductive contact surface including a central contact engagement portion and at least one contact engagement portion spaced from and at least partially surrounding the central contact engagement portion, which contacts the central contact and the at least one contact spaced from and at least partially surrounding the central contact and defines a short circuit between the central contact and at least one of the at least one contact when in a closed operative orientation.

Preferably, the central contact engagement portion and the at least one contact engagement portion spaced from and at least partially surrounding the central contact engagement portion are electrically connected.

In accordance with a preferred embodiment of the present invention the conductive contact surface is defined by a conductive coating formed on the at least one element. Additionally, the conductive coating includes carbon.

Preferably, the at least one element includes silicone rubber.

DETAILED DESCRIPTION OF PREFERRED EMBODIMENTS

Figure 1A:
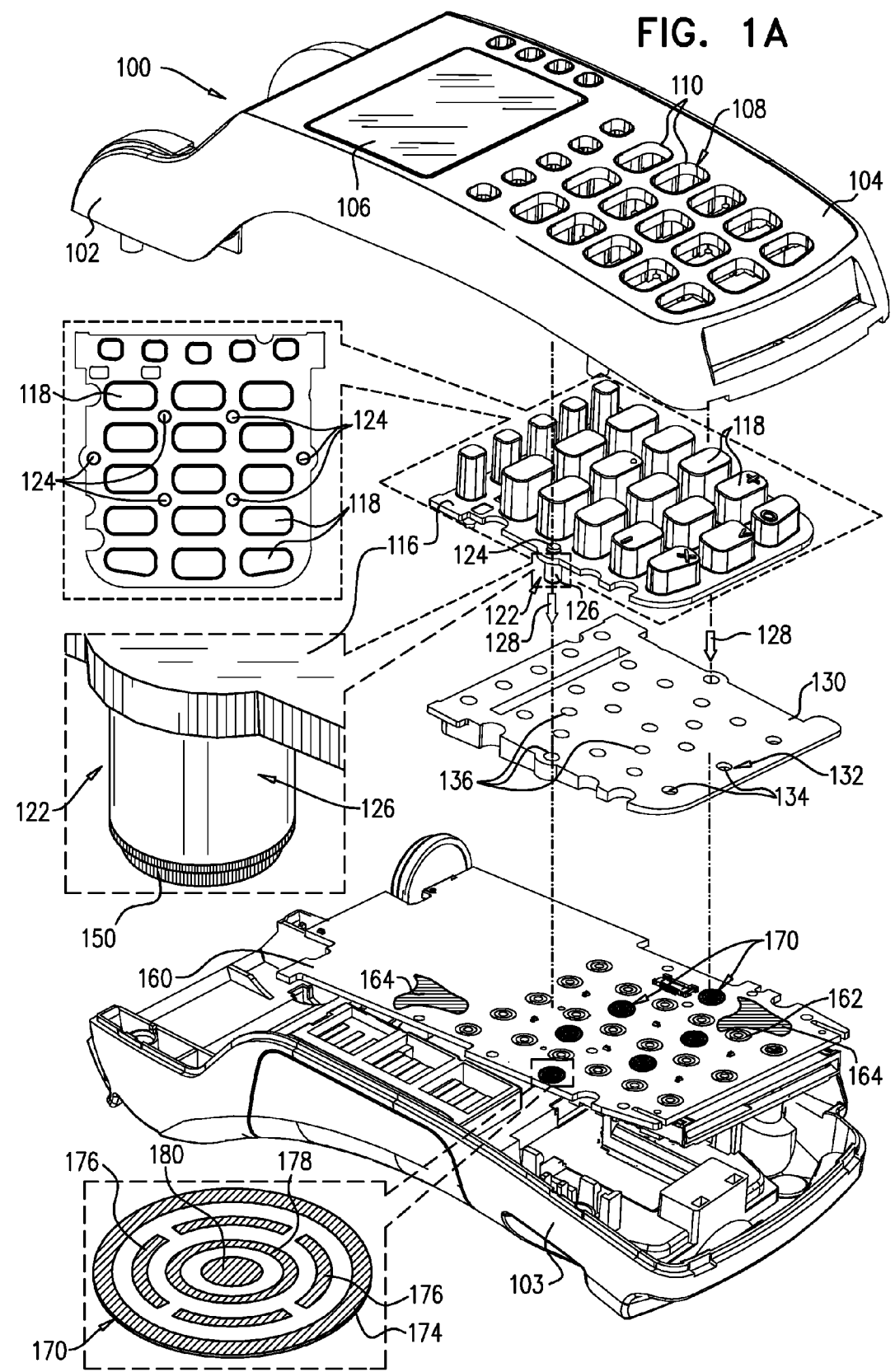
FIGS. 1A and 1B are simplified exploded view illustrations, taken in respective opposite directions, of part of a secure keypad device constructed and operative in accordance with a preferred embodiment of the present invention in a case open operative orientation.

The present invention seeks to provide an improved security system for electronic devices, especially tamper-protected point of sale terminals and other devices containing sensitive information, such as personal data and encryption keys. For the purposes of the present description and claims, the term "point of sale terminals" includes, inter alia, PIN pads, electronic cash registers, ATMs, card payment terminals and the like.

The point of sale terminals preferably include a housing, an anti-tamper protected enclosure located within the housing and adapted to contain the sensitive information, anti-tamper protection circuitry located within the anti-tamper protected enclosure and case open switches electrically coupled to the anti-tamper protection circuitry for protecting against unauthorized access to the interior of the anti-tamper protected enclosure.

Preferably, a confidential data storage element is located within the anti-tamper protected enclosure. Additionally or alternatively, a data entry element is also mounted in the housing.

Preferably, the anti-tamper protection circuitry is operative, in the event of unauthorized opening on the housing to perform at least one of the following actions: generate an alarm indication, disable the device and erase the sensitive data.

Reference is now made to FIGS. 1A-2B, which illustrate a secure keypad device constructed and operative in accordance with a preferred embodiment of the present invention.

As seen in FIGS. 1A-2B, there is provided a secure keypad device 100 including a housing element 102 which, together with a back panel 103, defines a keypad device housing. Housing element 102 includes, on a top surface 104 thereof, a display window 106, through which a display (not shown) may be viewed, and an array 108 of key apertures 110.

It is a particular feature of an embodiment of the present invention that the housing element 102 includes, on an underside surface 112 thereof, a plurality of spaced case open switch actuation protrusions 114.

A resilient key mat 116, preferably formed of a resilient plastic or rubber, defines a plurality of depressible keys 118, preferably integrally formed with the remainder of key mat 116, which partially extend through key apertures 110. Underlying each of keys 118 is a key actuation protrusion 120, preferably having on an underside surface thereof an electrical conductor 121. Alternatively, key actuation protrusions may engage conductive domes, not shown, as described in U.S. Pat. No. 8,358,218, the disclosure of which is hereby incorporated by reference.

Disposed at multiple locations on key mat are case open switch actuation responsive displaceable electrical contact portions 122, each including a top facing protrusion 124, which is engaged by a corresponding case open switch actuation protrusion 114, and a bottom facing electrical contact protrusion 126.

It is a particular feature of a preferred embodiment of the present invention that when the housing is closed, case open switch actuation protrusions 114 engage corresponding protrusions 124 and cause displacement of corresponding case open switch actuation responsive displaceable electrical contact portions 122 in a direction indicated by an arrow 128. Opening of the housing retracts case open switch actuation protrusions 114 from corresponding protrusions 124 and enables displacement of corresponding case open switch actuation responsive displaceable electrical contact portions 122 in a direction opposite to that indicated by arrow 128 as a result of resilience of the case open switch actuation responsive displaceable electrical contact portions 122 and key mat 116.

Underlying key mat 116 is a light guide element 130 which includes an array 132 of apertures 134 which accommodate key actuation protrusions 120. Preferably, light guide element 130 also includes a plurality of apertures 136, which accommodate bottom-facing electrical contact protrusions 126 of case open switch actuation responsive displaceable portions 122.

Figure 2A:
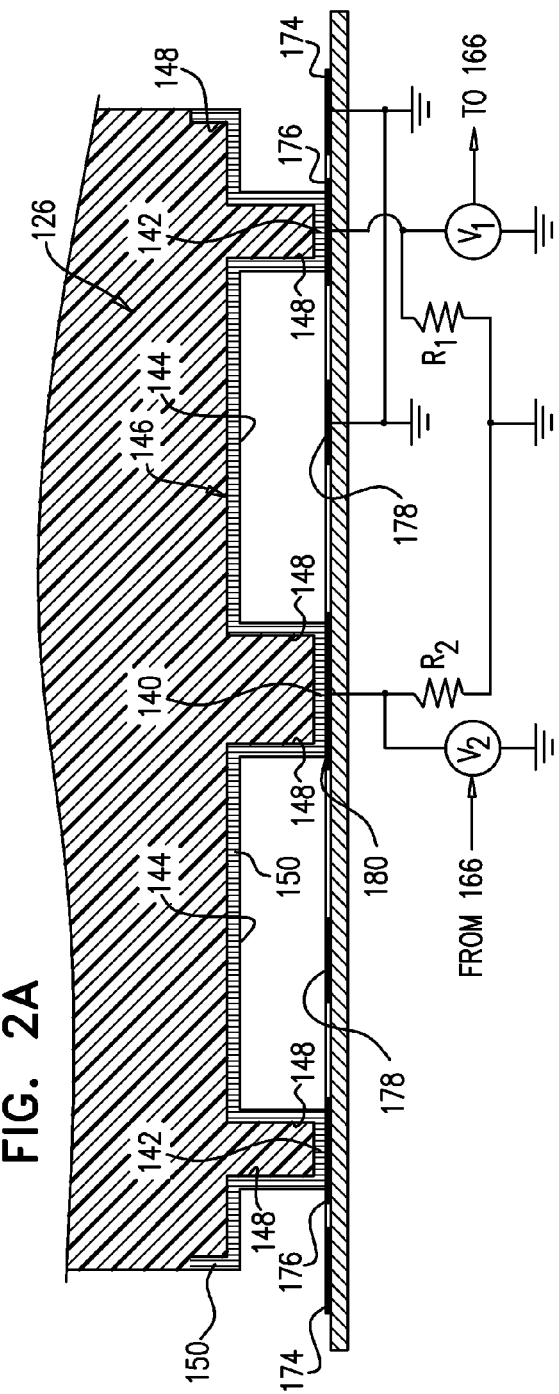
FIGS. 2A & 2B are simplified sectional illustrations of the case open switch of FIGS. 1A-1B in respective case closed and case open operative orientations.

In accordance with a preferred embodiment of the present invention, as seen with particularity in FIG. 2A, bottom-facing electrical contact protrusion 126 comprises a pair of preferably concentric coplanar, preferably circular flat surfaces having a conductive coating formed thereon. Preferably, the pair of concentric coplanar circular flat surfaces are electrically interconnected. In the illustrated embodiment, it is seen that the pair of concentric coplanar circular flat surfaces, when coated with a conductive coating, define a central conductive disc 140 and a conductive ring 142 concentrically spaced with respect thereto. Central conductive disc 140 and conductive ring 142 are preferably separated by a conductive recessed ring 144 and are conductively interconnected by the conductive coating.

As seen in FIG. 2A, preferably the entire bottom-facing surface 146 of bottom-facing protrusion 126, which is preferably formed of silicone rubber, and a peripheral edge 148 thereof are coated with an electrically conductive coating 150, which may include any suitable conductor, preferably carbon, but alternatively a metal conductor such as gold, silver or copper. Electrically conductive coating 150 on bottom-facing surface 146 of bottom-facing protrusion 126 thereby defines and conductively interconnects central conductive disc 140, conductive ring 142 and conductive recessed ring 144.

Underlying light guide element 130 is an electrical circuit board 160, which functions, inter alia, as a key contact pad board, defining a plurality of pairs of adjacent electrical contact pads 162, each pair underlying a corresponding key actuation protrusion 120. The arrangement of electrical circuit board 160 is preferably such that depression of a key 118 by the finger of a user causes conductor 121 to establish electrical contact with and between a corresponding pair of electrical contact pads 162 lying thereunder and in registration therewith. When key 118 is not depressed, no electrical contact exists between conductor 121 and a pair of corresponding electrical contact pads 162 or between the adjacent pads of the pair.

Electrical circuit board 160 preferably includes an anti-tampering grid 164 formed of a multiplicity of interconnected anti-tampering electrical conductors. Anti-tampering grid 164 is coupled to anti-tampering detection circuitry 166.

In accordance with a preferred embodiment of the present invention, case-open switches, which sense physical tampering and opening of the housing, are provided, each preferably including the following structure:
- an arrangement of electrical contacts 170 arranged on a base surface, preferably electrical circuit board 160, and
- the pair of concentric coplanar circular flat surfaces, which are electrically interconnected and include central conductive disc 140 and conductive ring 142, which define a short circuit between at least some, and preferably not all, of said arrangement of electrical contacts 170 only when said housing is closed.

The arrangement of electrical contacts 170 preferably includes an outer ring 174, an optionally quartered outer intermediate ring 176, an inner intermediate ring 178, and a central contact 180. It is appreciated that outer intermediate ring 176 may be a continuous ring or may be divided into any number of elements. Central conductive disc 140 is preferably aligned with central contact 180 and conductive ring 142 is preferably aligned with outer intermediate ring 176.

When the housing is opened by at least approximately 0.75 mm, one or more of the plurality of spaced case open switch actuation protrusions 114 is retracted from one or more corresponding top facing protrusions 124 of one or more case open switch actuation responsive displaceable portions 122, whose resilience causes corresponding retraction of one or more bottom facing protrusions 126, whose retraction breaks the electrical circuit between both central conductive disc 140 and conductive ring 142 and respective central contact 180 and outer intermediate ring 176. This is a particular feature of the present invention.

Figure 1B:
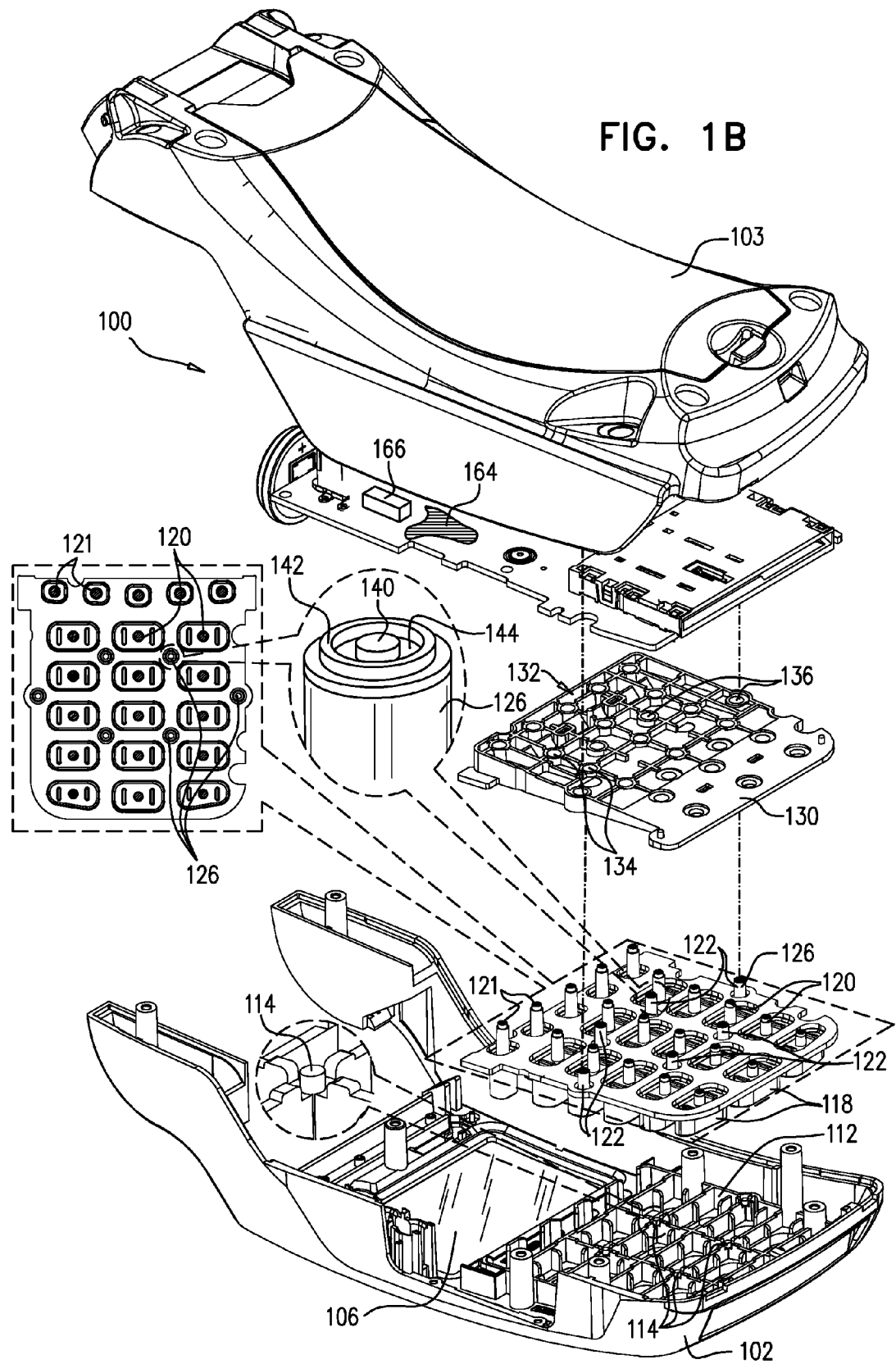
Figure 2B:
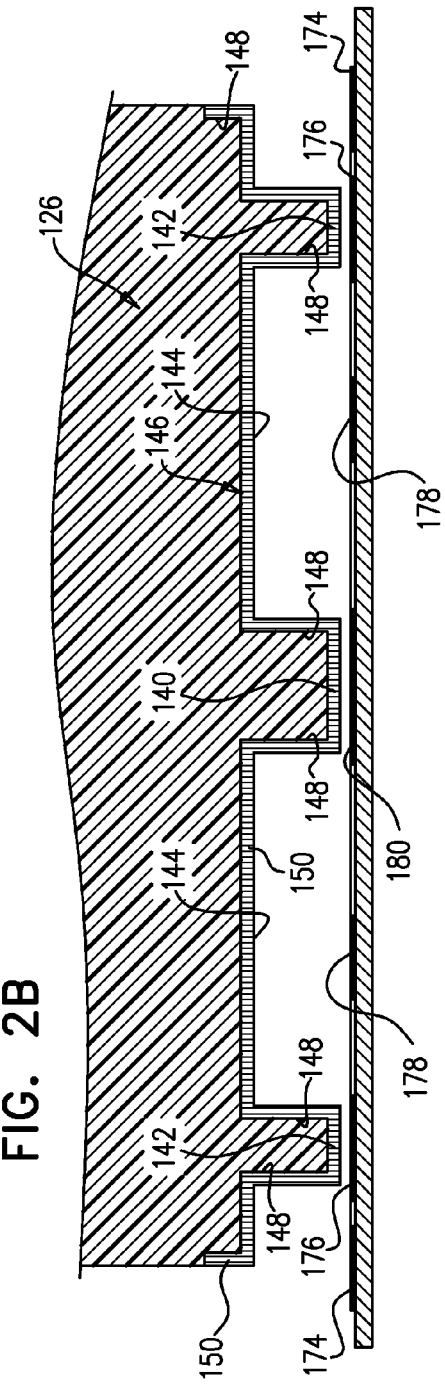

Reference is now made to FIGS. 2A and 2B, which are simplified sectional illustrations of the case open switch of FIGS. 1A & 1B in respective case closed and case open operative orientations.

As seen generally in FIG. 2A, when the housing is in a case closed operative orientation, case open switch actuation protrusions 114 (FIG. 1B) engage corresponding protrusions 124 (FIG. 1A) and cause displacement of corresponding case open switch actuation responsive displaceable portions 122 (FIGS. 1A & 1B) in the direction indicated by arrow 128. As a result, central conductive disc 140 and conductive ring 142 formed on bottom facing protrusion 126 of case open switch actuation responsive displaceable portions 122 are in touching and electrical contact with central contact 180 and outer intermediate ring 176 respectively, thus electrically connecting outer intermediate ring 176 with central contact 180. It is noted that due to the particular configuration and construction of bottom facing protrusion 126, no part of electrically conductive coating 150 formed on bottom-facing protrusion 126 is in electrical contact with either of rings 174 and 178.

As seen in FIG. 2A, outer ring 174 and inner intermediate ring 178 are both coupled to ground. Central contact 180 is coupled to an applied voltage $V_2$, which typically is in the range of 0-3.3 Volt, and via a damping resistor $R_2$, typically about 1 MOhm, to ground. Outer intermediate ring 176 is coupled via a resistor $R_1$, typically about 1 MOhm, to ground. Voltage $V_2$ is preferably supplied by anti-tamper circuitry 166 and a voltage $V_1$, which is developed across resistor $R_1$, is supplied to anti-tamper circuitry 166.

This circuitry is an example of circuitry which indicates whether the housing is open or closed, i.e. whether or not bottom-facing protrusion 126 is simultaneously in contact with both central contact 180 and outer intermediate ring 176. When bottom-facing protrusion 126 is simultaneously in contact with both central contact 180 and outer intermediate ring 176, $V_1$ is equal to $V_2$. Otherwise, $V_1$ is zero.

An attempt to tamper with the case open switch by short circuiting central contact 180 and outer intermediate ring 176 will also short circuit inner intermediate ring 178 with contact 180 and/or outer intermediate ring 176 or short circuit outer ring 174 with outer intermediate ring 176 and may be detected by measuring voltage $V_1$. During normal operation, where no tampering is detected, $V_1$ equal to $V_2$. An attempt to tamper with the case open switch causes voltage $V_1$ to be zero.

Anti-tampering circuitry 166 (FIG. 1B) preferably is operative to measure voltage $V_1$ and to provide tampering alarms and responses accordingly. Optional anti tampering grid 164 may also be coupled to anti tampering circuitry 166.

FIG. 2B shows the case-open switch in an open operative state, which may occur either prior to closing the housing or upon tampering.

Attempts to tamper with the case open switch, as by applying conductive adhesive or insertion of a conductive element into electrical short circuiting engagement with central contact 180 and outer intermediate ring 176 may be made in order to establish an electrical connection between ring 176 and contact 180 even when the housing is open.

Such attempts to tamper can be expected to result in establishment of an electrical connection between central contact 180 on the one hand and at least one of rings 174 and 178, thus producing an alarm.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

The invention claimed is:

1. A data entry device comprising:
a housing formed of at least two housing portions;
data entry circuitry located within said housing;
at least one case-open switch assembly operative to sense when said housing is opened; and
tamper indication circuitry operative to receive an input from said at least one case-open switch assembly and to provide an output indication of possible tampering with said data entry circuitry located within said housing,
said at least one case-open switch assembly including:
at least one arrangement of electrical contacts arranged on a base surface, said at least one arrangement including a central contact and at least one contact spaced from and at least partially surrounding said central contact; and
at least one element, having a conductive contact surface including a central contact engagement portion and at least one contact engagement portion spaced from and at least partially surrounding said central contact engagement portion, which contacts said central contact and at least one of said at least one contact spaced from and at least partially surrounding said central contact and defines a short circuit between said central contact and said at least one of said at least one contact only when said housing is closed.

2. A data entry device according to claim 1 and wherein said central contact engagement portion and said at least one contact engagement portion spaced from and at least partially surrounding said central contact engagement portion are electrically connected.

3. A data entry device according to claim 1 and wherein said conductive contact surface is defined by a conductive coating formed on said at least one element.

4. A data entry device according to claim 1 and wherein said at least one element comprises silicone rubber.

5. A data entry device according to claim 3 and wherein said conductive coating comprises carbon.

6. A data entry device according to claim 1 and also comprising a resilient key mat, which defines a plurality of depressible keys and said at least one element.

7. A data entry device according to claim 1 and wherein at least one of said housing portions includes, on an underside surface thereof, at least one case open switch actuation protrusion, which engages said at least one element, whereby, only when said housing is closed, said at least one case open switch actuation protrusion engages said at least one element and causes said conductive contact surface to define said short circuit between said central contact and at least one of said at least one contact.

8. A data entry device according to claim 7 and wherein opening of said housing retracts said at least one case open switch actuation protrusion from said at least one element and enables displacement of said element out of short circuit defining contact with said central contact and at least one of said at least one contact.

9. A data entry device according to claim 1 and wherein said central contact engagement portion and said at least one contact engagement portion spaced from and at least partially surrounding said central contact engagement portion are mutually spaced by a recess.

10. A data entry device according to claim 9 and wherein said central contact engagement portion, said at least one contact engagement portion spaced from and at least partially surrounding said central contact engagement portion and said recess are mutually short circuited by a conductive coating formed thereon.

11. A data entry device according to claim 1 and wherein:
said at least one arrangement of electrical contacts includes a central contact and at least two contacts spaced from and at least partially surrounding said central contact; and
said at least one element defines a short circuit between said central contact and some, but not all, of said at least two contacts when said housing is closed.

12. A data entry device according to claim 11 and wherein when said central contact engagement portion of said at least one element contacts said central contact, no part of said at least one element is in electrical contact with at least one of said at least two contacts.

13. A data entry device according to claim 12 and wherein said input to said tamper indication circuitry includes an indication of whether said at least one element is simultaneously in contact with both said central contact and one but not all of said at least two contacts.

14. A data entry device according to claim 12 and wherein said input to said tamper indication circuitry includes an indication of whether all of said at least two contacts are short circuited with said central contact.

15. A data entry device according to claim 1 and also comprising at least one anti-tampering grid, formed of a multiplicity of interconnected anti-tampering electrical conductors, associated with said tamper indication circuitry.

16. A case-open switch assembly for a data entry device including a housing, the case-open switch assembly comprising:
at least one arrangement of electrical contacts arranged on a base surface, said at least one arrangement including a central contact and at least one contact spaced from and at least partially surrounding said central contact; and
at least one element, having a conductive contact surface including a central contact engagement portion and at least one contact engagement portion spaced from and at least partially surrounding said central contact engagement portion, which contacts said central contact and at least one of said at least one contact spaced from and at least partially surrounding said central contact and defines a short circuit between said central contact and said at least one of said at least one contact when in a closed operative orientation.

17. A case-open switch according to claim 16 and wherein said central contact engagement portion and said at least one contact engagement portion spaced from and at least partially surrounding said central contact engagement portion are electrically connected.

18. A case-open switch according to claim 16 and wherein said conductive contact surface is defined by a conductive coating formed on said at least one element.

19. A case-open switch according to claim 16 and wherein said at least one element comprises silicone rubber.

20. A case-open switch according to claim 18 and wherein said conductive coating comprises carbon.

* * * * *